US000002006B1

(19) United States

(12) Statutory Invention Registration (10) Reg. No.: US H2006 H

Ellicks (43) Published: Nov. 6, 2001

(54) METHOD FOR REPAIRING DEFECTIVE ELECTROSTATIC SPRAY COATINGS

(75) Inventor: David F. Ellicks, Macon, GA (US)

(73) Assignee: The United States of America as represented by the Secretary of the Air Force, Washington, DC (US)

(21) Appl. No.: 09/490,292

(22) Filed: Jan. 21, 2000

(51) Int. Cl.[7] ..... B32B 35/00

(52) U.S. Cl. ..... 427/140; 427/143

(58) Field of Search ..... 427/140, 142

(56) References Cited

U.S. PATENT DOCUMENTS

| | | | | |
|---|---|---|---|---|
| 3,950,571 | * | 4/1976 | McBride | 427/142 |
| 4,544,578 | * | 10/1985 | Duane, Jr. | 427/140 |
| 4,786,524 | * | 11/1988 | Ardary et al. | 427/140 |
| 5,279,862 | * | 1/1994 | Corcoran et al. | 427/407.1 |
| 5,302,316 | * | 4/1994 | Hashimoto et al. | 252/183.11 |
| 5,413,809 | * | 5/1995 | Hazan | 427/140 |
| 5,470,605 | * | 11/1995 | Lundeen | 427/11 |
| 5,495,058 | | 2/1996 | Stevenson et al. . | |
| 6,015,871 | * | 1/2000 | Jamasbi et al. | 528/48 |

* cited by examiner

*Primary Examiner*—Harold J. Tudor

(74) *Attorney, Agent, or Firm*—Charles E. Bricker; Thomas L. Kundert

(57) ABSTRACT

A method for repairing scratches, dings, gouges or other minor imperfections in finishes applied by flame spraying, fluidized bed, hot flocking, electrostatic spray or electrostatic fluidized bed, which comprises dissolving a coating material in a suitable solvent, applying the resulting solution to a selected area, evaporating the solvent, and, optionally, curing the coating material.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR REPAIRING DEFECTIVE ELECTROSTATIC SPRAY COATINGS

RIGHTS OF THE GOVERNMENT

The invention described herein may be manufactured and used by or for the Government of the United States for all governmental purposes without the payment of any royalty.

BACKGROUND OF THE INVENTION

The present invention relates to a method for repairing defects in coatings originally applied by electrostatic spray.

A number of solventless-type painting or coating systems have been developed in which a finely divided, heat fusible material is deposited on a substrate, which deposit is then fused into a continuous functional or decorative film on the substrate. Representative of these type processes are flame spraying, fluidized bed, hot flocking, electrostatic spray (ESP) and electrostatic fluidized bed (ESFB). ESFB is a hybrid of fluidized bed and ESP.

Continual development in the ESP technology provided the breakthrough necessary to make powder coating an economical alternative to conventional liquid coating. In the typical ESP process the coating powder is maintained in a fluidized bed reservoir, injected into an air stream and carried to a spray gun where the powder is charged by passing through a stable corona discharge created by a high voltage source. The charged powder is then transported to a grounded part or substrate to be coated through a combination of electrostatic and aerodynamic forces. The powder is projected toward the substrate so that the aerodynamic forces bring the powder particles as close as possible to the substrate, where electrostatic forces predominate and cause the particles to be attracted to and deposited on the grounded substrate. The coated substrate is then heated, e.g., placed in an oven or furnace, whereby the individual powder particles melt, flow and form a continuous film on the substrate.

Several process aspects are involved in ESP, among which are powder charging, powder transport, adhesion mechanisms, self-limitation, back ionization and Faraday cage effect.

The self-limiting aspect of ESP has significant implications. For example, unskilled operators are able to spray at least flat substrates with only brief instruction and training since it is virtually impossible to create runs, drips or sags which are characteristic of spray applied liquid finishes. Further it makes possible the relatively easy and practical design of automatic spray installations. For example, multiple electrostatic spray guns may be mounted on reciprocators and positioned in staggered opposition to each other in an enclosed spray booth. Parts to be coated are then moved between the two banks of spray guns where a uniform coating of powder is applied. Since the applied layer is self-limiting, sufficient powder can be charged and applied to be sure there are no unduly thin or uncoated areas. Overspray powder is captured in the reclaim system and reused.

Compared to flame spraying and fluidized bed coating, some major advantages of ESP are that generally thinner films on the order of 75 microns (3 mils) or less can be consistently applied, smaller quantities of powder are used, and more intricately shaped substrates can be more uniformly coated. Consequently ESP has become a firmly established technology in which coatings, both thick and thin, can be consistently and uniformly applied on substrates, both flat-surfaced articles as well as some complicated or intricate shapes. ESP has proven suitable for applying a wide variety of such insulator or dielectric coatings as plasticized PVC, nylon, cellulosic, epoxy, polyurethane, polyester, acrylic and hybrid resin powders on a wide range of conductive substrates, especially metallic articles, such as can bodies, wire goods, pipe, tool housings, fire extinguisher bodies, household appliances, floor polishing machinery, sewing machine parts, hospital beds, trailer hitches, parts and accessories for automobile, motorcycle and bicycle, furniture for lawn, garden, office and home, and structural sections and facade elements.

Compared to conventional liquid spray painting methods, ESP provides the advantage that no solvents are employed, particularly those solvents classified by the Environmental Protection Agency (EPA) as Volatile Organic Compound (VOC), Hazardous Air Pollutant (HAP) and/or Ozone Depleting Compound (ODC).

Field-site repairs of scratches, dings, gouges or other minor imperfections in surface finishes applied by flame spraying, fluidized bed, hot flocking, electrostatic spray or electrostatic fluidized bed, are often less than satisfactory. Since there is no convenient way to repair or touch-up these finishes outside the original equipment manufacturing facility, such repairs generally comprise the use of over-the-counter paints, such as appliance touch-up paints. Field-site repairs generally do not provide an exact color match. Such repairs are not as durable as the original coating. As weathering occurs, the repair usually becomes very visible.

Accordingly, it is an object of the present invention to provide an improved method for repairing scratches, dings, gouges or other minor imperfections in finishes applied by flame spraying, fluidized bed, hot flocking, electrostatic spray or electrostatic fluidized bed.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there is provided an improved method for repairing scratches, dings, gouges or other minor imperfections in finishes applied by flame spraying, fluidized bed, hot flocking, electrostatic spray or electrostatic fluidized bed. The method of this invention comprises dissolving a coating material in a suitable solvent, applying the resulting solution to a selected area, evaporating the solvent, and, optionally, curing the coating material.

DETAILED DESCRIPTION OF THE INVENTION

Defective or imperfect finishes comprising electrostatically-applied original coatings such as plasticized PVC, nylon, cellulosic, polyurethane, polyester, acrylic and hybrid resin powders can be repaired by the method of this invention. The coating material, preferably identical as to type and color of the original, is dissolved in a suitable solvent to obtain a solution. The resulting solution is applied to a selected area containing a scratch, ding, gouge or other minor imperfection, with a brush, roller or air-propelled spray equipment. The solvent is then evaporated or allowed to evaporate from the surface. Depending on the type of coating applied, it may then be desirable to locally cure the coating, as by the application of heat or ultraviolet radiation.

Solvents suitable for use in the present invention include p-chlorobenzotrifluoride (PCBTF), acetone, methyl ethyl ketone (MEK), methyl isobutyl ketone, xylene and toluene. PCBTF is a preferred solvent because it is regulated by the Environmental Protection Agency as a Non-Volatile Organic Compound (Non-VOC), a Non Hazardous Air Pollutant (Non-HAP) and a Non-Ozone Depleting Compound (Non-ODC).

The concentration of the coating material in the solvent must be suitable for application. This may require some experimentation to achieve a suitable viscosity, but is easily changed by the addition of coating material or solvent.

The following example illustrates the invention:

EXAMPLE 12 g of Morton Corvel® 30-1007, white, color number U-1578-1 1007 polyester powder was dissolved in 28 g of p-chlorobenzotrifluoride to make a coating solution. A conventional powder coated metal coupon with a surface having a peeling paint defect was prepared for coating by lightly sanding the defect and the neighboring surface. The solution was brushed onto the surface and the PCBTF was allowed to evaporate for about 1 hour. After complete evaporation of the solvent and heating to 190° C. in a laboratory oven for 20 minutes the repaired area cured. The resulting repair closely matched the color and surface characteristics of the original finish.

I claim:

1. A method for repairing scratches, dings, gouges or other minor imperfections in finishes applied by flame spraying, fluidized bed, hot flocking, electrostatic spray or electrostatic fluidized bed, which comprises dissolving a coating material in a suitable solvent, applying the resulting solution to a selected area, and evaporating the solvent.

2. The method of claim 1 wherein said coating material is selected from the group consisting of plasticized PVC, nylon, cellulosic, polyurethane, polyester, acrylic and hybrid resin powders.

3. The method of claim 1 wherein said solvent is selected from the group consisting of p-chlorobenzotrifluoride, acetone, methyl ethyl ketone, methyl isobutyl ketone, xylene and toluene.

4. The method of claim 1 wherein said coating material is a polyester powder and wherein said solvent is p-chlorobenzotrifluoride.

5. A method for repairing scratches, dings, gouges or other minor imperfections in finishes applied by flame spraying, fluidized bed, hot flocking, electrostatic spray or electrostatic fluidized bed, which comprises dissolving a coating material in a suitable solvent, applying the resulting solution to a selected area, evaporating the solvent and curing the coating material.

6. The method of claim 5 wherein said coating material is selected from the group consisting of plasticized PVC, nylon, cellulosic, polyurethane, polyester, acrylic and hybrid resin powders.

7. The method of claim 5 wherein said solvent is selected from the group consisting of p-chlorobenzotrifluoride, acetone, methyl ethyl ketone, methyl isobutyl ketone, xylene and toluene.

8. The method of claim 5 wherein said coating material is a polyester powder and wherein said solvent is p-chlorobenzotrifluoride.

* * * * *